United States Patent [19]

Bailard et al.

[11] Patent Number: 4,506,686

[45] Date of Patent: Mar. 26, 1985

[54] PHYSIOCHEMICALLY CONTROLLED SCOUR JET ARRAY SYSTEM

[75] Inventors: James A. Bailard, Carpinteria; Scott A. Jenkins, San Diego, both of Calif.

[73] Assignee: The United States of America as represented by the Secretary of the Navy, Washington, D.C.

[21] Appl. No.: 584,834

[22] Filed: Feb. 29, 1984

[51] Int. Cl.³ ............... B05B 12/12; B08B 3/08; B63B 59/04; G05D 21/00
[52] U.S. Cl. .................. 134/57 R; 114/222; 134/123; 137/40; 137/93; 239/75
[58] Field of Search ............... 134/52-55, 134/56 R, 57 R, 94, 99, 100, 123, 144, 145, 148, 172, 176, 198, 199, 201; 114/222; 137/40, 41, 42, 3, 93; 239/63, 64, 66, 67, 69, 75

[56] References Cited

U.S. PATENT DOCUMENTS

| | | | |
|---|---|---|---|
| 3,773,059 | 11/1973 | Arneson | 134/123 |
| 3,837,916 | 9/1974 | Omachi | 114/222 X |
| 4,046,094 | 9/1977 | Preiser et al. | 114/222 |
| 4,209,131 | 6/1980 | Barash et al. | 239/80 X |
| 4,273,146 | 6/1981 | Johnson | 137/93 X |
| 4,462,328 | 7/1984 | Oram | 114/222 |

Primary Examiner—Harvey C. Hornsby
Assistant Examiner—S. Maltzman
Attorney, Agent, or Firm—Robert F. Beers; Joseph M. St. Amand

[57] ABSTRACT

The scour jet array system includes a pump, both fresh water and surface water intakes, an automatic water mixing valve, a chemical buffer injector, a water heater, a series of scour jets with control valves, and a central control system.

The control system senses the beginning of ebb tide for starting an initial scour jet, and as each jet scours the freshly deposited mud from the area, temperature, salinity and pH of the surface suction intake water are measured to determine the amount of fresh water injection, chemical buffer injection, water heating and duty cycle time in order to minimize the energy required to scour the sediments from the area.

17 Claims, 3 Drawing Figures

4,506,686

PHYSIOCHEMICALLY CONTROLLED SCOUR JET ARRAY SYSTEM

BACKGROUND OF THE INVENTION

This invention relates to the removal of sediments from a body of water, and particularly to the control of accumulation of sediments and removal thereof in berthing areas for ships.

Flocculated clay sediments are transported by rivers in a largely dispersed state, but upon reaching the more saline estuarine waters, they flocculate, settle and become concentrated near the bottom in a fluid-like mud layer. This mobile fluid mud layer is moved about by tidal and other bottom currents, eventually finding its way into quiet water areas, such as ship berthing areas.

Prior methods of controlling unwanted sedimentation within estuarine harbors consist of periodically removing the accumulated sediment using conventional hydraulic or mechanical dredging techniques. The latter include floating hydraulic suction dredges, hopper dredges, clamshell dredges, etc. These methods, however, are rapidly becoming uneconomical because of rising energy costs and decreasing availability of nearby dredge disposal sites. As a result, alternative sediment management methods have begun to be developed. One method which has shown particular promise has been the scour jet array. The scour jet array acts to prevent such sediment from being incorporated into the permanent bottom sediments, by periodically expelling the fluid mud layer from the protected area using the scouring action of an array of submerged, nearbottom water jets. A basic scour jet array consists of a pump, a subsurface suction intake, a distribution pipe, control valves and multiple submerged scour jets.

As flocculated sediment falls out of suspension, it concentrates near the bottom in a loose fluid-like mud layer. This layer is easily moved about by bottom currents, because it possesses little internal strength. This movement continues until it reaches a quiet water area with minimal bottom stresses. There, it begins to consolidate, rapidly increasing its internal strength and resistance to erosion. The rate of consolidation is non-linear with respect to time, occurring very quickly at first but later at a progressively slower rate. As a result, after a period of one or two days, the newly deposited fluid mud layer has essentially been incorporated into the permanent bottom sediments. The scour jet arrays act to break this consolidation process by remobilizing the fluid mud layer near the start of the process. The jetting action creates a region of high bed stress which easily erodes the mud and transports it from the protected area.

Field tests have shown that the scour jet array is an effective sediment control system. Unfortunately, its application, at present, is relatively limited. Laboratory and field tests have shown that the power required to scour sediment increases as the 4.5 power of the scour distance. As a consequence, for conventional scour jet arrays, scour distances in excess of 100 feet are not economical. The present invention, however, consists of several improvements and techniques which extend the economical range of a scour jet array, and dramatically increase its efficiency at lesser scour distances.

SUMMARY OF THE INVENTION

The scour jet array system of this invention includes a pump, both fresh water and surface water intakes, an automatic water mixing valve, a chemical buffer injector, a water heater, a series of scour jets with control valves, and a central control system. The central control system includes tidal, temperature, pH and salinity sensors which are used for controlling operation of the scour jets and various system components.

The scour jet array control system senses the beginning of ebb tide. The pump is started and an initial scour jet control valve is opened. As each jet scours the freshly deposited mud from the area, temperature, salinity and pH of the surface suction intake water are measured and input to a microprocessor. The microprocessor determines the amount of fresh water injection, chemical buffer injection, water heating and duty cycle time in order to minimize the energy required to scour the sediments from the area. Appropriate commands are then sent to the proper controllers and the process is repeated until all jets have been cycled. The present invention enhances the performance of a scour jet array by altering the physical and chemical properties of the scouring water. In particular, the salinity is decreased by a chemical buffer injection and the temperature is increased by a water heater. All techniques enhance the rate of scour of the sediment for a given shear stress, thereby reducing the power used by the system.

It is an object of the invention, therefore, to provide an improved scour jet array system for sedimentation control.

Another object of the present invention is to provide an improved scouring system for controlling and eliminating sediment from berthing areas.

A further object of the invention is to provide a physiochemical process for controlling and eliminating sediment from select areas in bodies of water.

With the above and other objects in view that will hereinafter appear, the nature of the invention will be more clearly understood by reference to the following detailed description, the appended claimed subject matter, and the several views illustrated in the accompanying drawings.

DESCRIPTION OF THE PREFERRED EMBODIMENT

A scour jet array operates by creating a zone of high shear stress in front of the array. In doing so, it consumes considerable amounts of energy. Recent experiments on the erosive behavior of cohesive clay sediments suggest several ways to increase the efficiency of a scour jet array. It has been found that the rate of erosion of clay sediments is very sensitive to changes in levels of salinity, temperature and pH in the interstitial and/or scouring water. Also, it was found that the rate of erosion can be significantly enhanced (by as much as two orders of magnitude) by small increases in the temperature and/or pH, or small reductions in the salinity. As a result of such tests, an improved scour jet has been devised using increased temperature of the scour water, increasing the pH of the scouring water, and decreasing the salinity of the scour water.

Figure 1:
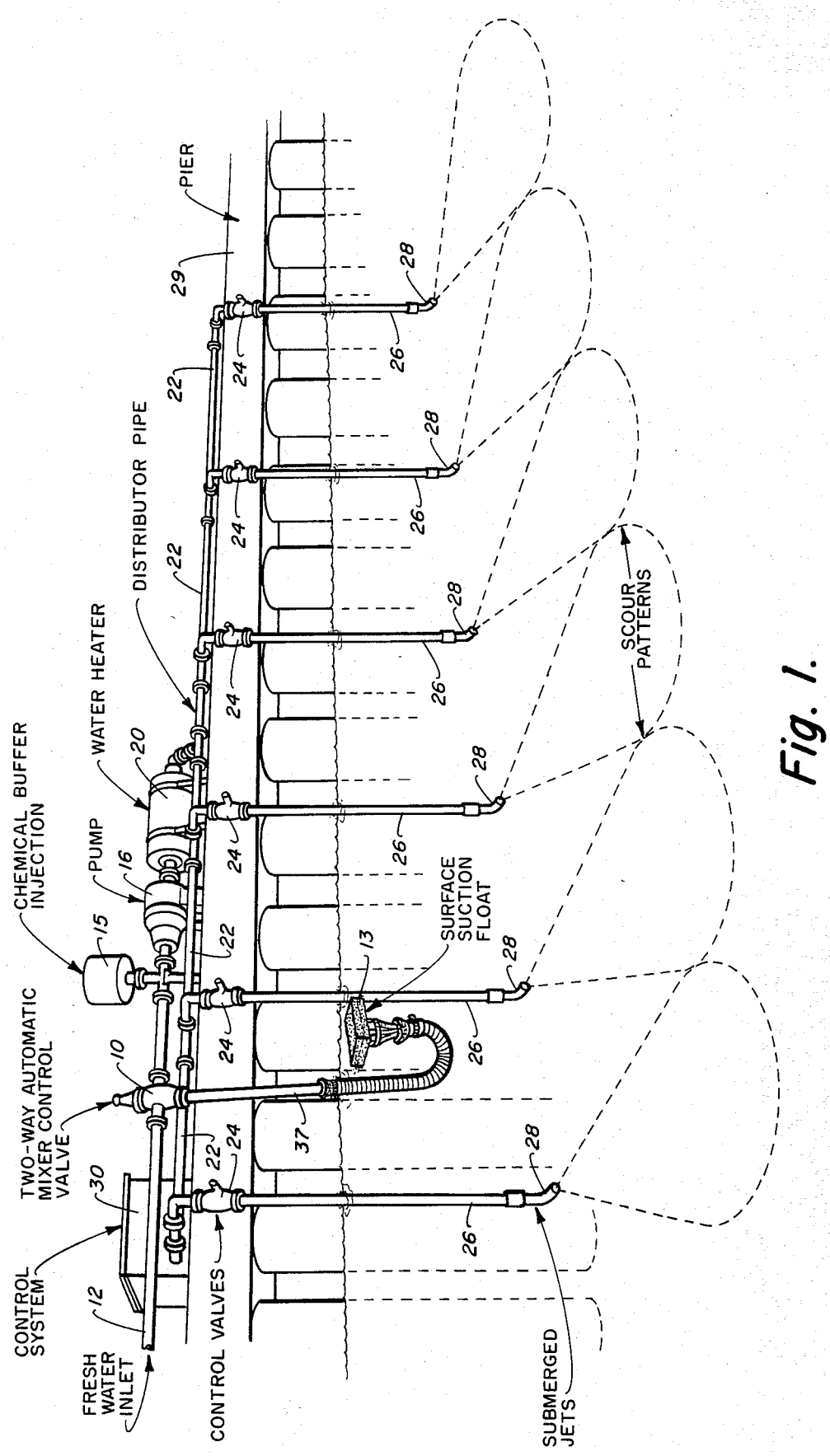
FIG. 1 illustrates the enhanced scour jet array system of the present invention for sedimentation control.

Referring to FIG. 1, the new and improved scour jet array system shown consists of a two-way automatic mixer control valve 10 connected to a fresh water inlet 12, a floating surface suction unit 13 (hereinafter described) and a chemcial buffer injection device 15. The chemical buffer injection unit 15, in turn, is connected to the system pump 16 which pumps a chemically treated mixture of fresh and/or saline water to water heater 20. From heater 20 the treated scour water is distributed via distributor pipelines 22 to multiple control valves 24 and respective lines 26 to submerged jet heads 28 which form a jet array for scouring. The entire scouring system apparatus, as shown in FIG. 1, can be mounted on a pier or dock 29.

High pressure water emerging from the jets 28 create a region of high bed stress in front of the jet array, thus serving to both erode and transport from the protected area any newly deposited fluid mud. The jets are operated sequentially during ebb tide so to assure that the eroded sediment is carried from the area. Operation of the jet array is controlled by a microprocessor control system 30, with inputs from several different sensors, as shown in FIG. 3 and hereinafter described.

The relative flowrates from the surface suction 13 intake and the fresh water injection 12 pipes are regulated via two-way automatic control valve 10. Chemical buffer injection device 15 between automatic mixer control valve 10, and the pump intake, as shown in FIG. 1, allows a chemical buffer, such as sodium hydroxide, to be injected into the jet scouring water in order to increase the pH. Downstream of the pump, water heating device 20 is used to raise the temperature of the jet scouring water as required. Most of the other components of the improved scour jet array, such as pump 16, distributor pipes 22, jets 28 and the jet control valves 24 are similar to those for a conventional scour jet array.

Figure 2:
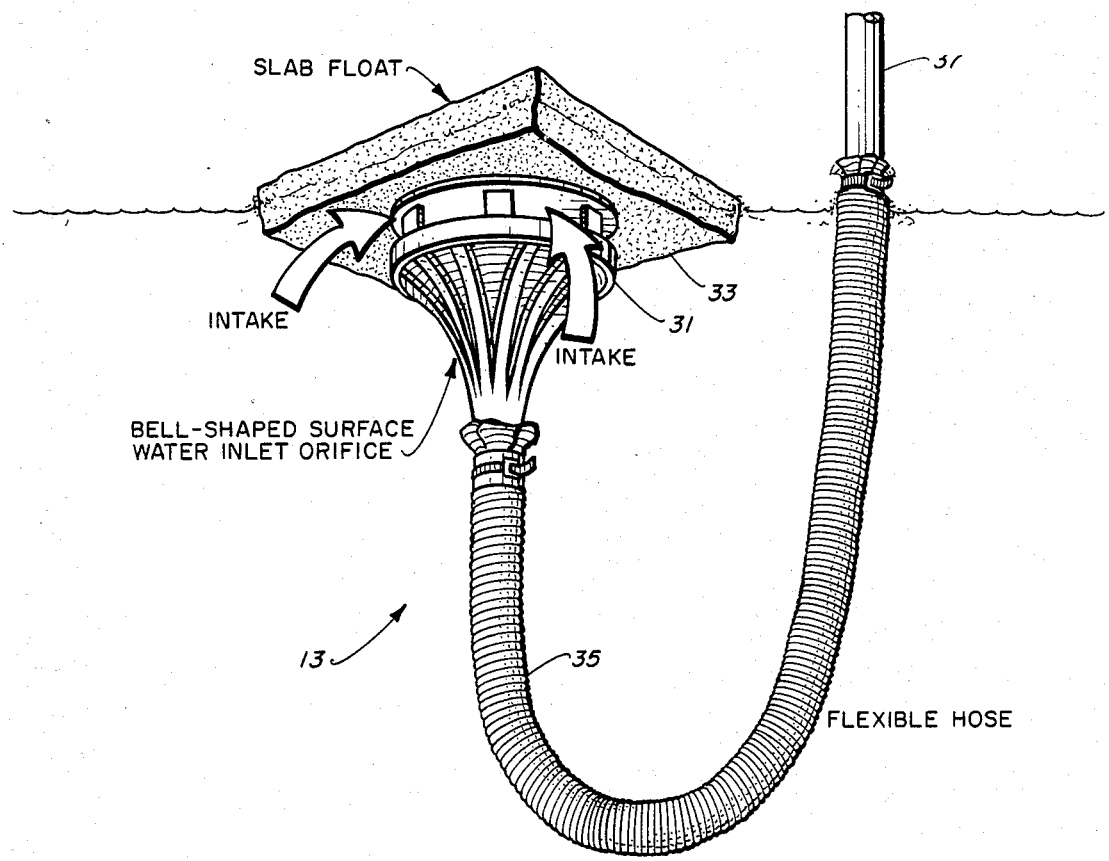
FIG. 2 is an enlarged perspective view of the surface suction float shown in FIG. 1.

As more clearly shown in FIG. 2, the floating surface suction unit 13 is composed of a bell shaped intake orifice 31 attached to a flat slab shaped float 33. A flexible hose 35 leads from the orifice 31 intake to a surface water intake pipe 37 via the downward oriented flexible hose loop. The loop in hose 35 provides enough compliance to accomodate any changes in the water level due to tides.

Figure 3:
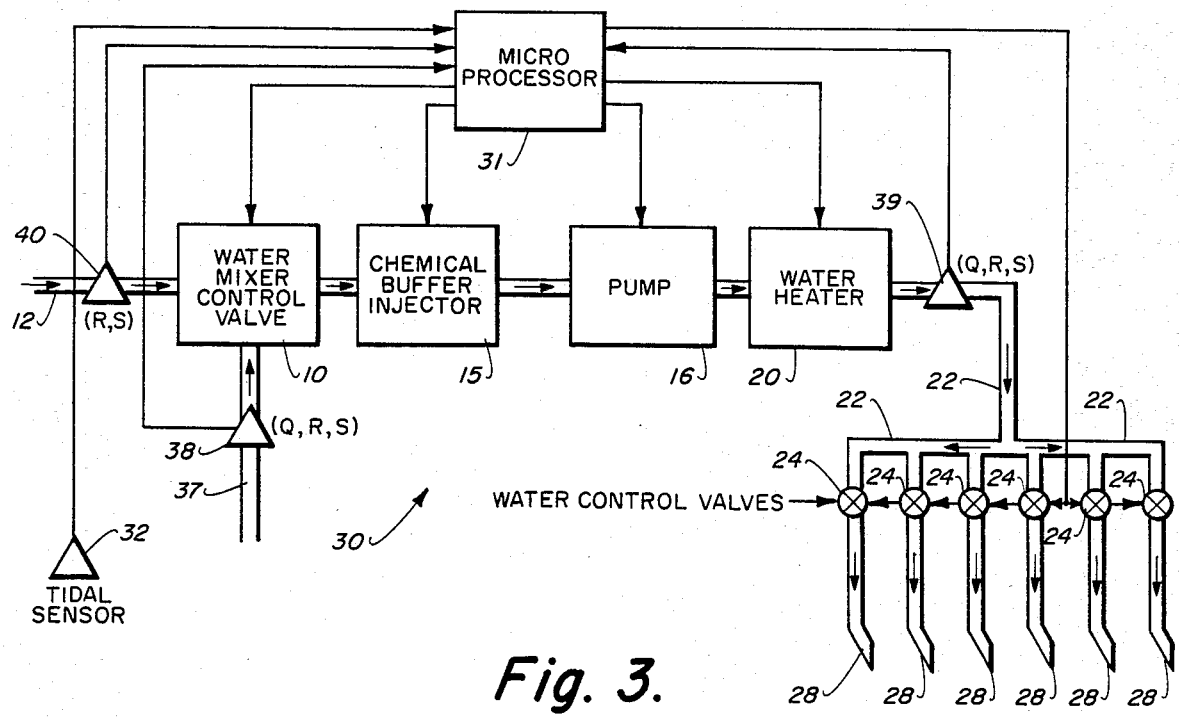
FIG. 3 is a schematic diagram of a control system for the improved sedimentation control apparatus, which includes temperature, salinity, pH, and tidal sensors.

Referring to FIG. 3, the control system 30 consists of a microprocessor 31, a tidal sensor 32, two salinity sensors Q (one at 38 at inlet 37 to water mixer control valve 10, and one at 39 at the outlet from water heater 20), three water temperature sensors R (one sensor at 40 at the fresh water inlet 12 and one at the surface water inlet at 38 which feed to water mixer control valve 10, and one at 39 at the outlet from water heater 20), three pH sensors S (one each at 38 and 40 at the water inlets 12 and 37, and at the water outlet at 39). These sensors are all connected to microprocessor 31. There are also automatic controls from microprocessor 31 to water mixer control valve 10, to chemical buffer injector 15, to pump 16, to water heater 20 and to each of the scour water control valves 24. Signals from the various sensors, via microprocessor 31, control the rate of injection of the chemical buffer, the rate of heating, and the rate of water flow through each jet 28, based on desired set parameters.

The system operates as follows. During flood tide, the system is at rest. When the control system senses the beginning of ebb tide from sensor 32, pump 16 is started and the first of the series of scour jet control valves 24 is opened. As the first of jets 28 begins to scour freshly deposited mud from the area, the temperature, salinity and pH of the surface suction intake water from line 37 is measured at 38 and inputed to the microprocessor 31. From these inputs, the microprocessor then determines the proper amount of fresh water injection needed from inlet 12, as well as the amount of chemical buffer injection, water heating and duty cycle time for each of jets 28 so as to minimize the energy required to scour the sediments from the area. The appropriate commands are then sent to respective controllers at 10, 15, 16, 20 and to the first of control valves 24. After the first jet scouring cycle is completed, the control system operates to close the control valve 24 to the first jet while at the same time opening the control valve 24 to the next adjacent jet. Each valve 24 is individually controlled from the microprocessor control center 31. This process is repeated until all of the jets 28 have been cycled. At this point, 16 pump, heater 20, etc., are switched off and the system waits until the next ebb tide.

The augmented scour jet array has the important advantage of using significantly less energy than a conventional scour jet array. This reduces the system lifetime cost and makes the system economically attractive to otherwise marginal sites. Several new features contribute to the success of this system. First, there is a floating surface suction unit 13. Many estuaries are stratified, having both warmer and less saline surface water overlying colder, more saline bottom water. By locating the pump intake at the surface, less heating is required and less fresh water is needed to dilute the jet discharge water. Second, fresh water injection is used to reduce the salinity of the jetting water when the surface waters are too saline. The rate of injection of the diluting water is adjusted by the control system via automatic control valve 10. Third is the chemical buffer injection device. When control system 30 senses that the pH of the jetting water is too low, the device 15 is activated to inject a chemical buffer such as sodium hydroxide into the jetting water to adjust the pH to a desired level. Another new feature is water heating device 20 which warms the jetting water when needed. Also, the control system with its attendant sensors and control valves greatly enhances the operation of the entire system.

Alternate construction permits using arrays of different configurations, such as an area array where the jets are distributed in a horizontal grid across the bottom of area where sedimentation is to be controlled. In addition, the distribution pipes can be submerged, etc. Where the surface water temperature in a water area is usually significantly higher than lower strata water, there is less need for a heater which can then be omitted.

Obviously many modifications and variation of the present invention are possible in light of the above teachings. It is therefore to be understood that within the scope of the appended claims the invention may be practiced otherwise than as specifically described.

What is claimed is:

1. An improved scour jet array system for control and elimination of sedimentation accumulation in ship berthing areas and the like, comprising:

a. A series of submerged water scouring jet heads positioned in an array which form a desired scouring pattern near the bottom of a water area to be cleared of unwanted sediments;

b. a surface water supply inlet means located in said water area;
c. pump means connected to said surface water supply inlet for pumping surface water from said water area to said submerged jet heads for scouring purposes;
d. a series of distribution lines for distributing scouring water under pressure from said pump means to each of said series of jet heads;
e. a series of control valves, each associated with a respective one of said series of submerged jet heads for individually turning-on and shutting-off said jet heads;
f. fresh water injection means for adding and mixing fresh water with surface water pumped to said jet heads to dilute the salinity of said surface water to be used as scouring water;
g. chemical buffer injection means for adding chemicals to the scouring water for adjusting the pH of the scouring water to a desired level;
h. means for heating the scouring water distributed to said jet heads to a desired temperature;
i. means for individually sensing the temperature of said surface water, said fresh water and the scouring water from said heating means;
j. means for individually sensing the salinity of intake water at said surface water supply inlet and of the scouring water distributed to said jet heads;
k. means for indivually sensing the pH of said surface water, of said fresh water, and of said scouring water distributed to the jet heads;
l. tidal sensor means;
m. automatic control means connected to said tidal sensor means, to each of said temperature sensing means, to each of said salinity sensing means, to each of said pH sensing means, and to each of said series of control valves for said jet heads, to said pump means, to said fresh water injection means, to said chemical buffer injection means, and to said water heating means; signals from the tidal sensor means operating to initiate activation of the system, and signals from said temperature, salinity and pH sensing means to said automatic control means being used to operate and control the pump means and rate of scouring water flow from said submerged jet heads, the heat means and rate of scouring water heating, the chemical buffer injector means and amount of chemicals injected to adjust the scouring water pH, and the amount of fresh water added to the pumped surface water from said fresh water injector means; each of said jet heads being operated to turn-on or shut-off for a given duty cycle by said automatic control means connected to each of said respective control valves for controlling and removing sedimentation during ebb tide using minimum energy.

2. An improved scour jet array system as in claim 1 wherein said chemical buffer is sodium hydroxide.

3. An improved scour jet array system as in claim 1 wherein said fresh water injection means comprises a fresh water supply inlet connected to a two-way automatic mixer control valve which is also connected to said surface water supply inlet; said two-way automatic mixer control valve in turn being connected to said pumping means.

4. An improved scour jet array system as in claim 1 wherein said surface water supply inlet means comprises a surface water intake orifice connected beneath a float means and connected to said pump means via a flexible hose loop which allows for tidal fluctuations in water level, whereby warmer and less saline surface waters are pumped into the system.

5. An improved scour jet array system as in claim 1 wherein said automatic control means includes a microprocessor control center for processing signals from all sensors and in turn controlling the various component controls.

6. An improved scour jet array system as in claim 1 wherein said submerged jet heads are individually operated for a given duty cycle, one at a time in series, one being shut-off as the next is being turned-on until the jet scouring cycle for each of the series of jet heads is completed.

7. An improved scour jet array system as in claim 6 wherein the system is automatically shut-off upon completion of the jet scouring cycle for each of the series of jet heads, and reactivated at commencement of the next ebb tide.

8. An improved scour jet array system for control and elimination of sedimentation accumulation in ship berthing areas and the like, comprising:
a. A series of submerged water scouring jet heads positioned near the bottom of a water area to be cleared of unwanted sediments;
b. pump means for pumping warmer surface water from said water area to said jet heads;
c. control valves associated with said series of submerged jet heads for turning-on and shutting-off said jet heads;
d. means for adding and mixing fresh water with said surface water pumped to said jet heads;
e. means for adding chemicals to the scouring water for adjusting the pH to a desired level;
f. means for heating the scouring water;
g. means for sensing the temperatures of said surface water, said fresh water and the scouring water;
h. means for sensing the salinity of intake water and of the scouring water distributed to said jet heads;
i. means for sensing the pH of said surface water, said fresh water, and said scouring water distributed to the jet heads;
j. a tidal sensor means;
k. automatic control means responsive to signals from said tidal sensor means, said temperature sensing means, said salinity sensing means, and said pH sensing means to initiate activation of the system and to control the operation of said control valves for said jet heads, said pump means, said means for adding and mixing fresh water, said chemical buffer injection means, and said water heating means for controlling and removing sedimentation using minimum energy.

9. An improved scour jet array system as in claim 8 wherein said means for adding and mixing fresh water comprises a fresh water supply inlet connected to a two-way automatic mixer control valve which is also connected to said surface water from said water area.

10. An improved scour jet array system as in claim 8 wherein said surface water is supplied from an inlet means comprising a surface water intake orifice suspended beneath a float means and connected to said pump means via a flexible hose loop which allows for tidal fluctuations in water level, whereby warmer and less saline surface waters from said water area are pumped into the system.

11. An improved scour jet array system as in claim 8 wherein said automatic control means includes a microprocessor control center for processing signals from all sensors and in turn controlling controls in the various system components.

12. An improved scour jet array system as in claim 8 wherein said submerged jet heads are individually operated for a given duty cycle, one being shut-off as the next is being turned-on until the jet scouring cycle for each of the series of jet heads is completed, the system being automatically shut-off upon completion of the jet scouring cycle for each of the series of jet heads, and reactivated at commencement of the next ebb tide.

13. An improved scour jet array system for control and elimination of sedimentation accumulation in ship berthing areas and the like, comprising:
   a. A series of submerged water scouring jet heads positioned near the bottom of a water area to be cleared of unwanted sediments;
   b. pump means for pumping warmer surface water from said water area to said jet heads;
   c. control valves associated with said series of submerged jet heads for turning-on and shutting-off said jet heads;
   d. means for adding and mixing fresh water with said surface water pumped to said jet heads;
   e. means for adding chemicals to the scouring water for
   f. means for sensing the salinity of intake water and of scouring water distributed to said jet heads;
   g. means for sensing the pH of said surface water, said fresh water, and said scouring water distributed to the jet heads;
   h. a system activation means;
   i. automatic control means responsive to signals from said activation means, said salinity sensing means, and said pH sensing means to initiate activation of the system and to control the operation of said control valves for said jet heads, said pump means, said means for adding and mixing fresh water, and said chemical buffer injection means, for controlling and removing sedimentation using minimum energy.

14. An improved scour jet array system as in claim 13 wherein said means for adding and mixing fresh water comprises a fresh water supply inlet connected to a two-way automatic mixer control valve which is also connected to said surface water from said water area.

15. An improved scour jet array system as in claim 13 wherein said surface water is supplied from an inlet comprising a surface water intake orifice suspended beneath a float means and connected to said pump means via a flexible hose loop which allows for tidal fluctuations in water level, whereby warmer and less saline surface waters from said water area are pumped into the system.

16. An improved scour jet array system as in claim 13 wherein said automatic control means includes a microprocessor control center for processing signals from all sensors and in turn controlling controls in the various sytem components.

17. An improved scour jet array system as in claim 13 wherein said submerged jet heads are individually operated for a given duty cycle, one being shut-off as the next is being turned-on until the jet scouring cycle for each of the series of jet heads is completed, the system being automatically shut-off upon completion of the jet scouring cycle for each of the series of jet heads, and reactivated at commencement of the next ebb tide.

* * * * *